(12) United States Patent
Henry et al.

(10) Patent No.: US 10,286,722 B2
(45) Date of Patent: May 14, 2019

(54) MARKER MAKER

(71) Applicant: CRAYOLA, LLC, Easton, PA (US)

(72) Inventors: Robert J. Henry, Bethlehem, PA (US);
Joseph Moll, Bethlehem, PA (US);
James Allen, Nazareth, PA (US); David A. Cziraky, Bethlehem, PA (US)

(73) Assignee: CRAYOLA LLC, Easton, PA (US)

( * ) Notice: Subject to any disclaimer, the term of this patent is extended or adjusted under 35 U.S.C. 154(b) by 341 days.

(21) Appl. No.: 14/881,988

(22) Filed: Oct. 13, 2015

(65) Prior Publication Data
US 2016/0031256 A1 Feb. 4, 2016

Related U.S. Application Data

(63) Continuation of application No. 13/765,179, filed on Feb. 12, 2013, now Pat. No. 9,193,212.

(51) Int. Cl.
*B43K 15/00* (2006.01)
*B43K 11/00* (2006.01)
(Continued)

(52) U.S. Cl.
CPC .............. *B43K 15/00* (2013.01); *B30B 1/04* (2013.01); *B30B 9/00* (2013.01); *B43K 8/02* (2013.01);
(Continued)

(58) Field of Classification Search
CPC .. B30B 1/04; B30B 1/24; B30B 15/08; B30B 9/00; B30B 12/00; Y10T 29/53826;
(Continued)

(56) References Cited

U.S. PATENT DOCUMENTS

| 1,202,308 | A | * | 10/1916 | Perry | ..................... B25B 27/02 29/267 |
| 3,581,378 | A | | 6/1971 | Jozens | |
| 5,878,471 | A | * | 3/1999 | Hardy | ..................... B30B 1/24 29/251 |
| 5,895,160 | A | | 4/1999 | Ginelli | |
| 6,655,551 | B2 | | 12/2003 | Manne | |

(Continued)

FOREIGN PATENT DOCUMENTS

| EP | 0564666 A1 | 10/1993 |
| EP | 1090779 A1 | 4/2001 |

(Continued)

OTHER PUBLICATIONS

European Extended Search Report dated Jun. 1, 2016 for European Patent Application No. 14751432.7, 8 Pages.
(Continued)

*Primary Examiner* — Matthew P Travers
(74) *Attorney, Agent, or Firm* — Shook, Hardy & Bacon LLP

(57) ABSTRACT

A marker-making kit for assembling a marking device having a user-determined mixture of marking solution is provided. The kit includes a base unit coupled to a marker positioning mechanism and a press mechanism. A mixing tube holder secures a mixing tube used for collecting a desired amount of one or more marker fluids. A mixed marker solution is combined, including any number of different colors of marker fluid, and used to saturate a marker reservoir. The saturated reservoir may then be transferred to a maker barrel positioned near the press mechanism. By applying an amount of force with a marker compression arm, a completed marker is secured, enclosing the marker reservoir inside a marker barrel.

19 Claims, 11 Drawing Sheets

(51) Int. Cl.
    *B30B 1/04*            (2006.01)
    *B30B 9/00*            (2006.01)
    *B43K 8/02*            (2006.01)
    *B43K 8/03*            (2006.01)
    *B44D 3/08*            (2006.01)
    *B23P 11/00*          (2006.01)
    *B23P 19/04*          (2006.01)
    *B23P 19/12*          (2006.01)
    *B25B 11/02*          (2006.01)

(52) U.S. Cl.
    CPC .............. *B43K 8/03* (2013.01); *B43K 11/005* (2013.01); *B23P 11/00* (2013.01); *B23P 19/04* (2013.01); *B23P 19/12* (2013.01); *B25B 11/02* (2013.01); *B44D 3/08* (2013.01); *Y10T 29/49826* (2015.01); *Y10T 29/49998* (2015.01); *Y10T 29/53443* (2015.01); *Y10T 29/53474* (2015.01); *Y10T 29/53826* (2015.01)

(58) Field of Classification Search
    CPC ......... Y10T 29/53896; Y10T 29/53443; Y10T 29/53474; Y10T 29/49945; Y10T 29/49998; Y10T 29/53987; B23P 19/00; B23P 19/02; B23P 19/04; B23P 19/12; B43K 8/02; B43K 8/03; B43K 11/00; B43K 11/005; B43K 15/00; B25B 27/02; B25B 27/04–27/06; B25B 27/08–27/12; B25B 27/14
    See application file for complete search history.

(56) References Cited

U.S. PATENT DOCUMENTS

| | | | |
|---|---|---|---|
| 7,350,418 B2 | 4/2008 | Kosmyna et al. | |
| 9,193,212 B2* | 11/2015 | Henry | B43K 8/02 |
| 2004/0172140 A1* | 9/2004 | Bonutti | A61B 17/1606 |
| | | | 623/23.51 |
| 2011/0062101 A1* | 3/2011 | Todd, Jr. | A47B 53/00 |
| | | | 211/144 |
| 2013/0167973 A1 | 7/2013 | Dong et al. | |

FOREIGN PATENT DOCUMENTS

| | | | |
|---|---|---|---|
| GB | 2440731 A | 2/2008 | |
| JP | 09271511 A * | 10/1997 | .............. B30B 1/04 |
| WO | 2007102043 A1 | 9/2007 | |
| WO | 2012168632 A1 | 12/2012 | |

OTHER PUBLICATIONS

International Search Report with Written Opinion dated Apr. 30, 2014 in Application No. PCT/US2014/015790, 8 pages.
Non-Final Office Action dated Mar. 5, 2015 in U.S. Appl. No. 13/765,179, 11 pages.
Instructables—Food Coloring Markers.pdf, by user ""depotdevoid"", available online Feb. 7, 2012, accessed Feb. 26, 2015, http://web.archive.org/web/20120207174316/http://www.instructables.com/id/Food-Coloring-Markers.
Notice of Allowance dated Jul. 23, 2015 in U.S. Appl. No. 13/765,179, 10 pages.
Canada Notice of Allowance dated Jan. 15, 2018 in CA Appln. No. 2,888,729, 1 page.

\* cited by examiner

MARKER MAKER

CROSS-REFERENCE TO RELATED APPLICATIONS

This application is a continuation of and claims priority to U.S. application Ser. No. 13/765,179, filed Feb. 12, 2013, titled "Marker Maker." Ser. No. 13/765,179 is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief and at a high level, this disclosure describes, among other things, a marker-making kit for assembling a customized marking device. The kit includes a base unit having a marker positioning mechanism and a press mechanism. The kit also includes marker reservoirs, barrels, nibs, and end plugs used to assemble a marking device. Additionally, the kit may provide mixing tubes and measuring cups for creating customized marker solutions that are applied to marker reservoirs.

DESCRIPTION OF THE DRAWINGS

Illustrative embodiments of the invention are described in detail below with reference to the attached drawing figures, and wherein.

DETAILED DESCRIPTION

Figure 1:
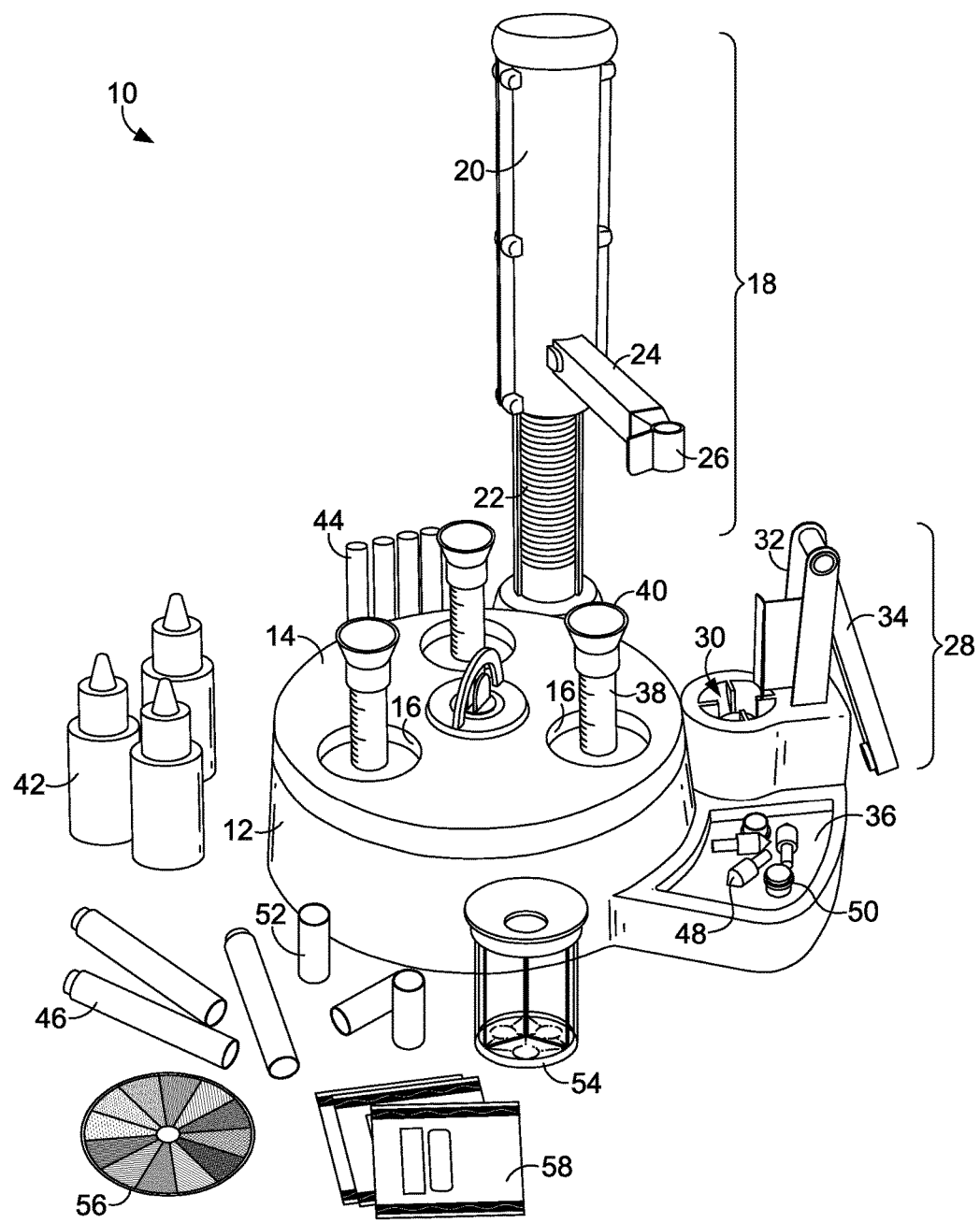
FIG. 1 is a perspective view of a marker-making kit, in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In one embodiment of the invention, a marker-making kit comprises: a base unit; one or more mixing tubes; one or more marker barrels; one or more marker nibs; one or more marker reservoirs; one or more end plugs; and a press mechanism coupled to the base unit, the press mechanism adapted to assemble a marker comprising one of the one or more marker barrels, one of the one or more marker nibs, one of the one or more marker reservoirs, and one of the one or more end plugs.

In another embodiment of the invention, a method of assembling a marking device comprises: dispensing an amount one or more marker fluids into a mixing tube to provide a mixed marker solution; saturating a marker reservoir with the mixed marker solution; securing the saturated marker reservoir inside a marker barrel; and assembling a marking device comprising the marker barrel securing the saturated marker reservoir, a marker nib, and a marker end plug.

In a further embodiment, a marker-making kit comprises: one or more mixing tubes; one or more marker barrels; one or more marker nibs; one or more marker reservoirs; one or more end plugs; a base unit comprising a plurality of storage compartments adapted to store at least one of the one or more mixing tubes, the one or more marker barrels, the one or more marker nibs, the one or more marker reservoirs, and the one or more end plugs; an articulating arm coupled to the base unit, the articulating arm adapted to rotatably maneuver a position of at least one of the one or more marker reservoirs relative to at least one of the one or more mixing tubes; and a press mechanism coupled to the base unit, the press mechanism adapted to assemble a marker comprising one of the one or more marker barrels, one of the one or more marker nibs, one of the one or more marker reservoirs, and one of the one or more end plugs, wherein the press mechanism comprises a compression arm and a marker positioner.

With reference initially to FIGS. 1-5, embodiments of the marker-making kit 10 includes a base unit 12 with a marker fluid color-mixing tray 14 having mixing-tube holders 16 on a surface of the mixing tray 14. The base unit 12 is coupled to a marker-positioning mechanism 18 having an articulating arm 20 that pivots about a height-adjustment support post 22. Articulating arm 20 is coupled to a marker pivot arm 24 and a marker pivot clip 26. Also coupled to the base unit 12 is a press mechanism 28, which in some embodiments includes marker compression positioner 30, compression support posts 32, and marker compression arm 34. As further depicted in FIG. 1, embodiments of the marker-making kit 10 include an accessory holder 36, a graduated-cylinder mixing tube 38, a plug-in funnel 40, a marker fluid bottle 42, a marker reservoir 44, a marker barrel 46, a marker nib 48, an end plug 50, a marker cap 52, a tri-chamber measuring cup 54, a color wheel mixing guide 56, and marker labels 58.

Figure 2:
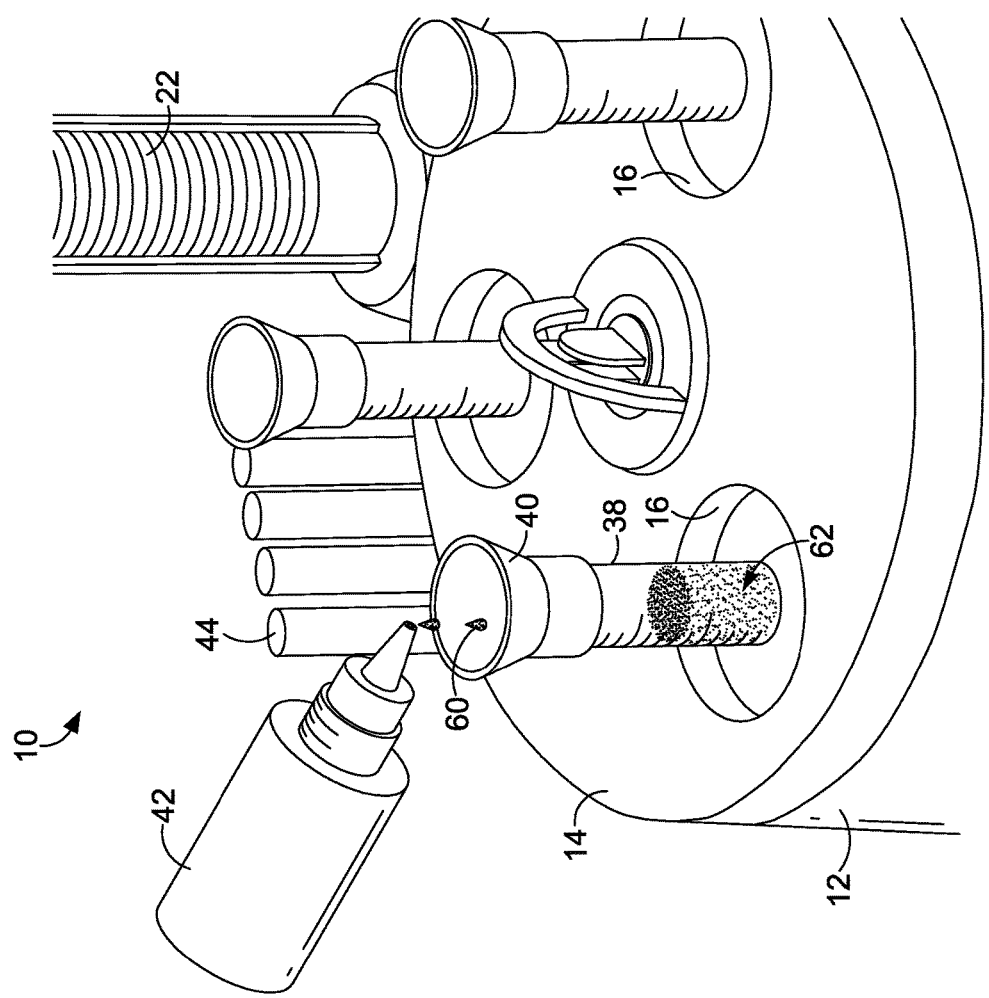
FIG. 2 is an enlarged, perspective view of a portion of the marker-making kit of FIG. 1, in accordance with an embodiment of the invention.

During marker assembly with the marker-making kit 10, mixing tube 38 is secured in an upright position by mixing-tube holder 16 on color-mixing tray 14. As depicted in FIG. 2, a user may fill the mixing tube 38 with marker fluid 60 from marker fluid bottle 42. Mixing tube 38 is depicted as including a plug-in funnel 40 at a top edge of the mixing tube 38, such that mixing tube 38 has a configuration similar to a graduated cylinder. As will be understood, mixing tube 38 may be any shape of container that accepts marker fluid 60, and facilitates the application of such solution to a marker reservoir 44. Accordingly, in some embodiments, mixing tube 38 and plug-in funnel 40 are combined into a single unit for containing marker fluid 60. In further embodiments, mixing tube 38 has a cylindrical shape without a separate, fluted edge.

In embodiments, marker fluid 60 may be any solution for marking on a surface, such as a washable ink solution, a non-washable ink solution, a permanent ink solution, a color-changing ink solution, an invisible-ink solution, and/or any other marker ink solution. Additionally, in embodiments, marker fluid 60 may be any color of marker ink solution, and multiple different marker fluid bottles 42 may include multiple different colors of marker fluids 60. In one example, the marker-making kit 10 includes a blue washable ink solution in a first marker fluid bottle 42, a red washable ink solution in a second marker fluid bottle 42, and a yellow washable ink solution in a third marker fluid bottle 42. Accordingly, embodiments of the marker-making kit 10 include one or more marker fluid bottles 42 for dispensing a customized amount of marker fluid 60 into a mixing tube 38.

In embodiments, based on receiving marker fluid 60 from one marker fluid bottle 42, or receiving different colors of marker fluid 60 from multiple marker fluid bottles 42, a mixed marker solution 62 fills at least a portion of the mixing tube 38. Accordingly, mixed marker solution 62 may include any number of different colors of marker fluid 60, or a single color of marker fluid 60, that are dispensed into the mixing tube 38. For example, mixed marker solution 62 may include a first quantity of a first marker fluid 60 from a first marker fluid bottle 42 (such as a blue washable ink solution) as well as a second quantity of a second marker fluid 60 from a second marker fluid bottle 42 (such as a red washable ink solution). In embodiments, marker-making kit 10 includes a color wheel mixing guide 56 that indicates recommended ink colors for mixing together while preparing the mixed marker solution 62.

Figure 3:
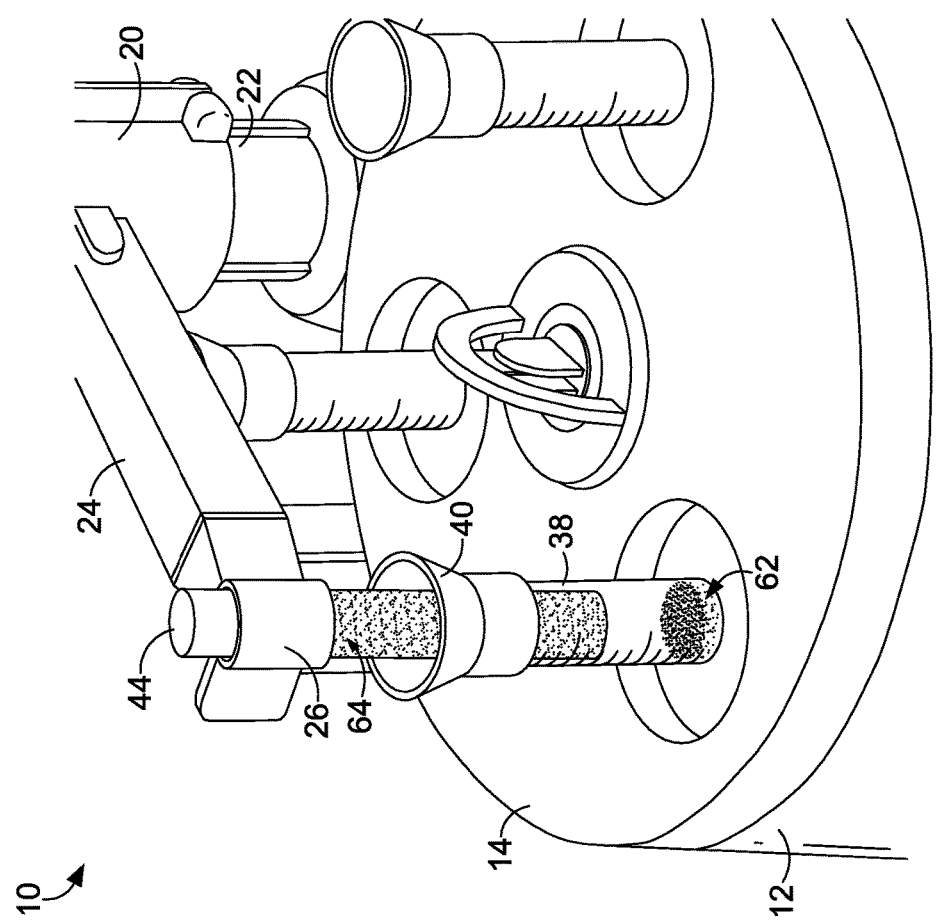
FIG. 3 is an enlarged, perspective view of a portion of the marker-making kit of FIG. 1, in accordance with an embodiment of the invention.

Turning now to FIG. 3, having collected a quantity of marker fluid 60 inside the mixing tube 38, a marker reservoir 44 may be submerged into mixed marker solution 62. In embodiments, the marker pivot clip 26 secures the marker reservoir 44 to an end of the marker pivot arm 24 for maneuvering of the marker reservoir 44 by the articulating arm 20. In one example, the articulating arm 20 may be raised and lowered with respect to the height adjustment support post 22. In some embodiments, the marker-positioning mechanism 18 is spring-loaded, which allows a user to dip a marker reservoir 44 in and out of a mixing tube 38. For example, articulating arm 20 may be spring loaded for movement with respect to the height-adjustment support post 22, such that pressure applied against or removed from at least a portion of the marker-positioning mechanism 18 allows gradual raising and lowering of a marker reservoir 44 into a mixed marker solution 62. In embodiments, the spring-loaded feature of the marker-positioning mechanism 18 permits movement with respect to particular positions of the base unit 12 and/or color-mixing tray 14. For example, when the marker pivot arm 24 of the articulating arm 20 is pivoted to a particular location with respect to the color-mixing tray 14, then the marker-positioning mechanism 18 may enable spring-loaded movement of the device to allow dipping of a marker reservoir 44 into a mixing tube 38. As such, the spring-loaded movement (i.e. raising and lowering of the reservoir 44) may be permitted, in some embodiments, when a mixing tube holder 16 is vertically aligned with a marker pivot clip 26.

In some embodiments, the articulating arm 20 may also rotate about the height adjustment support post 22, thereby moving the marker reservoir 44 between a variety of positions with respect to the base unit 12. For example, the articulating arm 20 may be used to rotate the marker reservoir 44 from a first position near the mixing tubes 38 on color-mixing tray 14, to a second position near the press mechanism 28. In embodiments, the articulating arm 20 may be used to manipulate the marker reservoir 44 from submersion inside the mixing tube 38, to hovering above the mixing tray 14, to securing inside a marker barrel 46.

In embodiments, color-mixing tray 14 may be secured into one of a plurality of positions with respect to the base unit 12 such that, in each position, one of the mixing tube holders 16 is aligned directly below the marker pivot clip 26 (with the articulating arm 20 in a first position). For example, the articulating arm 20 may be maneuvered into a first position, with the marker pivot clip 26 aligned over a first mixing tube holder 16, based on a first position of the color-mixing tray 14. The color-mixing tray 14 may then be rotated with respect to the base unit 12 and engaged in a second position, such that a second mixing tube holder 16 is now aligned with the marker pivot clip 26. In a further example, the color-mixing tray 14 may again be rotated with respect to the base unit 12 and engaged in a third position, such that a third mixing tube holder 16 is aligned with the marker pivot clip 26. In some embodiments, the color-mixing tray 14 may be engaged into one of multiple different positions with respect to the base unit 12 using detents in one or both of the color-mixing tray 14 and base unit 12. As such, detents on either component may stop the rotation of the color-mixing tray 14 to align a mixing tube 38 (secured by a mixing tube holder 16) with a reservoir 44 (secured by the marker pivot clip 26).

As shown in FIG. 3, the articulating arm 20 may lower the marker reservoir 44 into the mixing tube 38, to provide a saturated reservoir 64 of mixed marker solution 62. As will be understood, "saturation" of the marker reservoir 44 is not meant to imply that all of the mixed marker solution 62 is absorbed by the reservoir 44, or that the entire marker reservoir 44 is fully saturated by all of the mixed marker solution 62. Instead, only a small amount of mixed marker solution 62 may be absorbed by reservoir 44, based at least in part upon the amount of time the marker reservoir 44 is submerged in the solution. Accordingly, a saturated reservoir 64 may include any amount of a mixed marker solution 62 that is absorbed into a marker reservoir 44.

Figure 4:
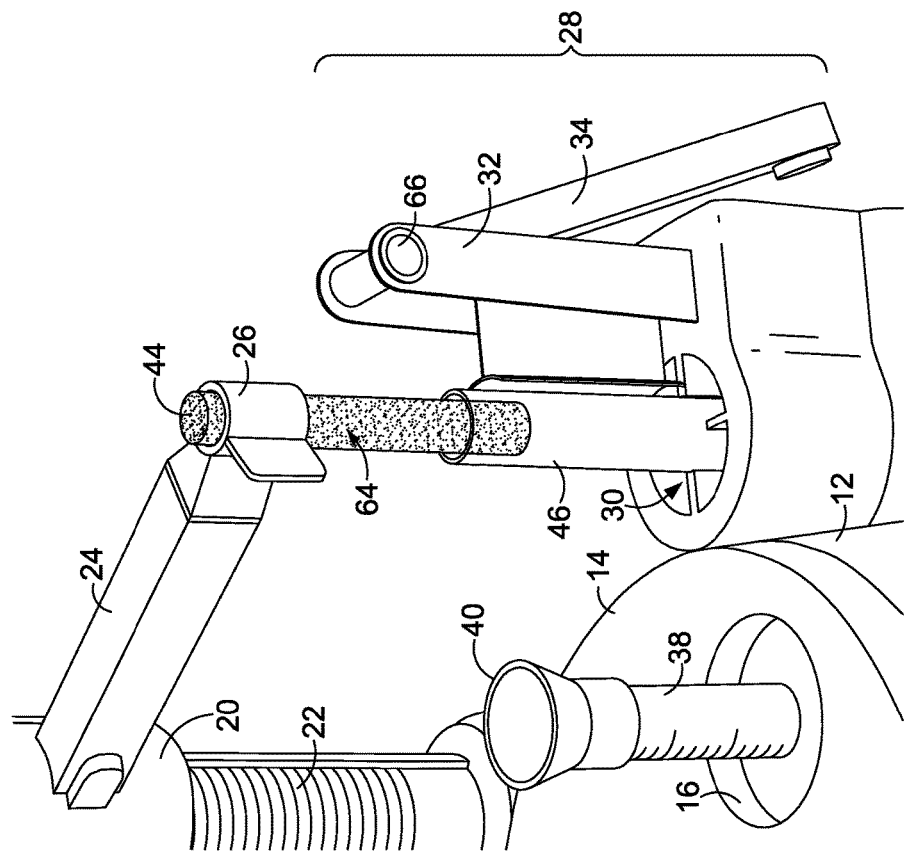
FIG. 4 is an enlarged, perspective view of a portion of the marker-making kit of FIG. 1, in accordance with an embodiment of the invention.

As shown in FIG. 4, the saturated reservoir 64 may be maneuvered by the marker positioning mechanism 18 into orientation with a press mechanism 28. In one example, the user may lower the saturated reservoir 64 into a marker barrel 46 that is secured by the marker compression positioner 30. In some embodiments, in addition to placing the saturated reservoir 64 inside the marker barrel 46, a user may also position a marker nib 48 inside the marker barrel 46, with the marker nib 48 being coupled directly or indirectly to the saturated reservoir 64. Accordingly, in some embodiments, one or more additional marker components may be combined with the saturated reservoir 64 inside the marker barrel 46. As such, marker barrel 46 may be configured to accept any number or configuration of additional marker components such that the saturated reservoir 64 and additional components are secured by the marker barrel 46. In one embodiment, marker nib 48 may be a single nib unit, or multiple units, that provide for the transfer of mixed marker solution 62 from the saturated reservoir 64 onto a writing surface, such as a piece of paper. In further embodiments, marker nib 48 may be a traditional marker nib, a conical marker nib, a Crayola® Crazy Tips marker nib, and/or a Crayola® Bullet marker component.

Figure 5:
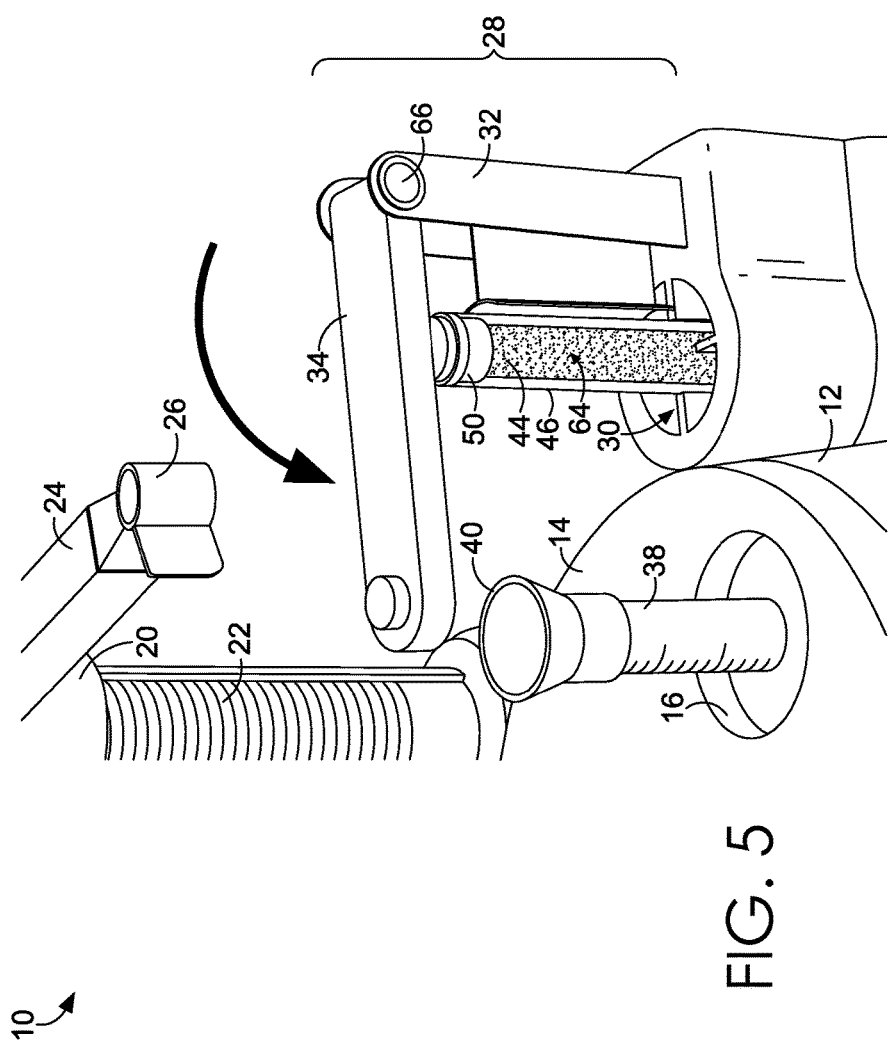
FIG. 5 is an enlarged, perspective view of a portion of the marker-making kit of FIG. 1, in accordance with an embodiment of the invention.

In FIG. 5, an end plug 50 is placed at an end of the marker barrel 46. As such, the marker compression arm 34 is moved from a first position (depicted in FIG. 4) to a second position (depicted in FIG. 5). In the second position, the marker compression arm 34 secures the end plug 50 onto the end of the marker barrel 46, and completes the assembly of the marker barrel 46 enclosing a customized, saturated reservoir 64. In some embodiments, a user may then attach a marker cap 52 to the opposite end of the marker barrel 46 from where the end cap 50 was secured, to further enclose the marker reservoir 44 and/or marker nib 48. Additionally, once a marker is assembled, a user may apply a marker label 58 to an exterior surface of the marker.

Figure 6:
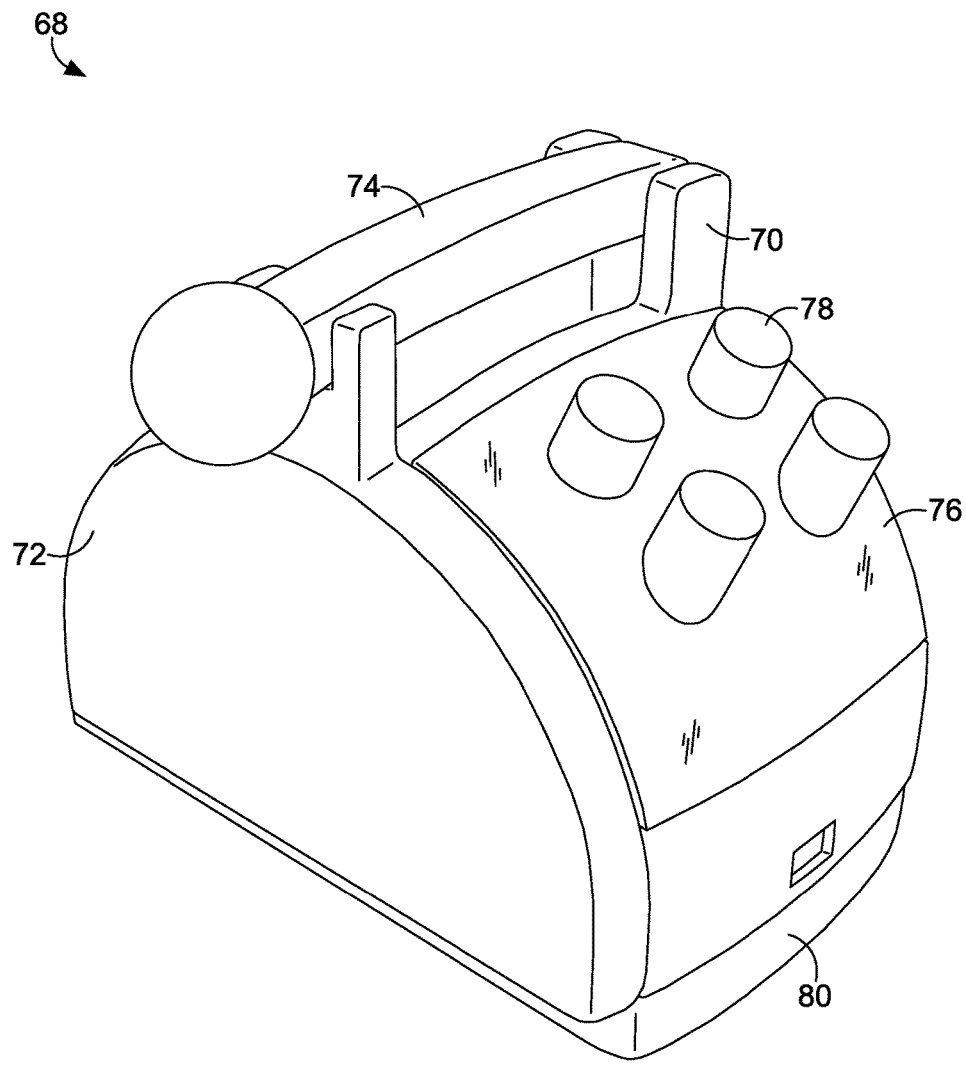
FIG. 6 is a perspective view of a marker-making kit, in accordance with an embodiment of the invention.
Figure 7:
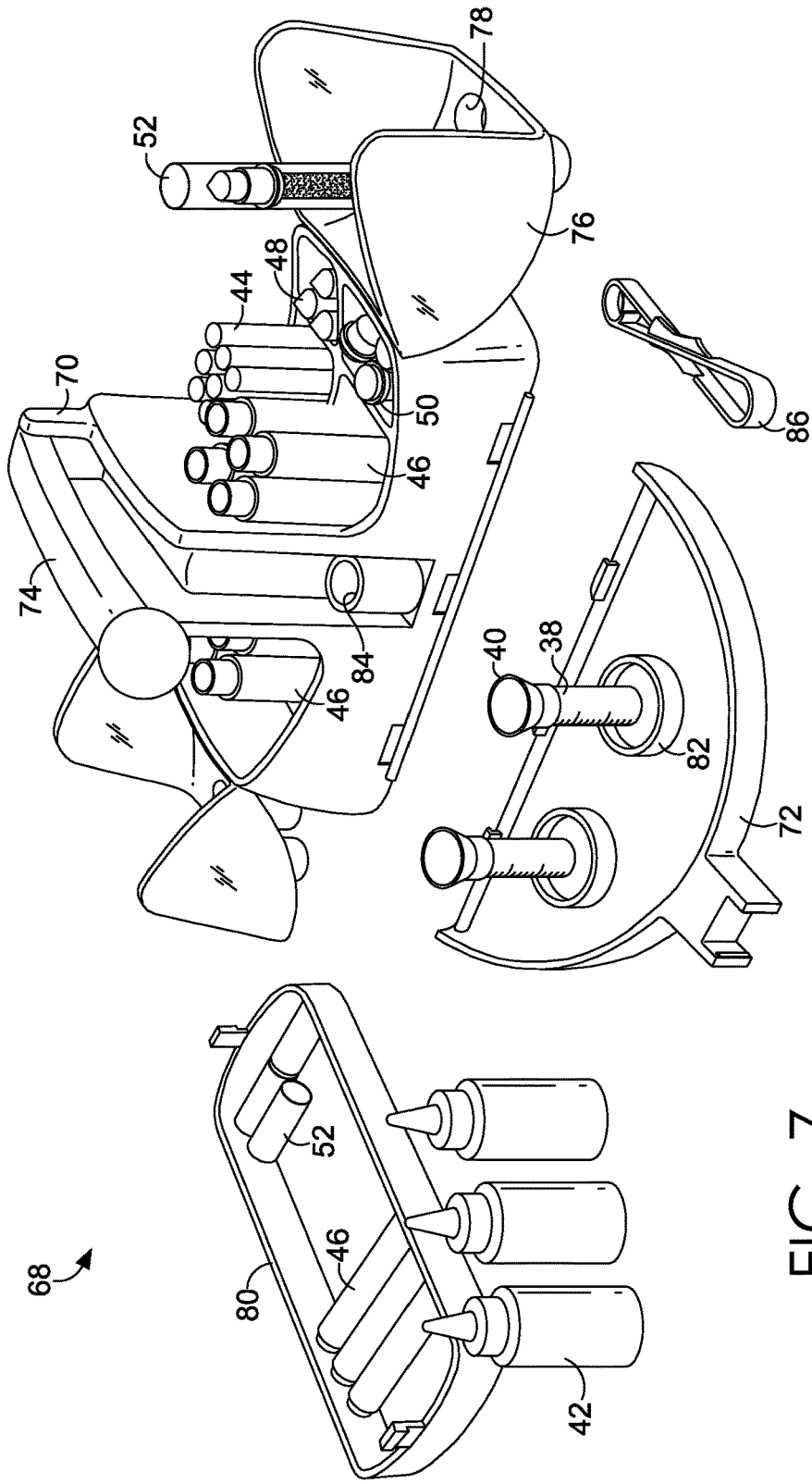
FIG. 7 is a perspective view of the marker-making kit of FIG. 6, in accordance with an embodiment of the invention.

Turning now to FIG. 6, in another embodiment of the invention, a marker-making kit 68 includes a base unit 70, a color-mixing tray 72, a compression arm 74, a side tray 76, a marker holder 78, and a bottom tray 80. In the expanded view of FIG. 7, the marker-making kit 68 includes mixing tube holders 82, a marker compression positioner 84, and reservoir tweezers 86. Similar to marker-making kit 10, the marker-making kit 68 may also include mixing tubes 38, plug-in funnels 40, marker reservoirs 44, marker barrels 46, marker nibs 48, end caps 50, and marker cap 52. As shown in FIGS. 6-7, the bottom tray 80 of the marker-making kit 68 may be removed from a bottom surface of the base unit 70, and may include one or more marker barrels 46, and one or more marker caps 52. Further, mixing tube holders 82 on a surface of the color-mixing tray 72 serve to support one or more mixing tubes 38, while completed markers may be positioned inside the marker holder 78 of the side tray 76. As shown in FIGS. 6-7, color-mixing tray 72 may be removed from a side surface of the base unit 70, and the side tray 76 may be pivoted away from the base unit 70 into an open position.

Figure 8:
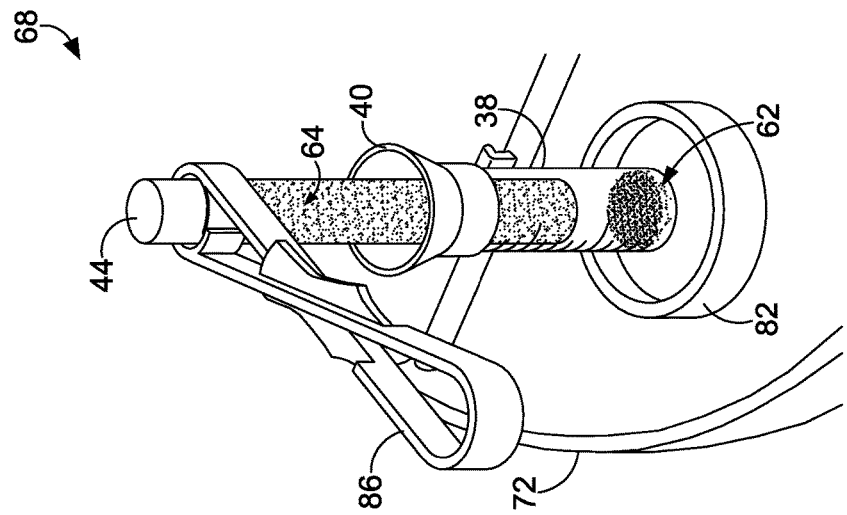
FIG. 8 is an enlarged, perspective view of a portion of the marker-making kit of FIG. 6, in accordance with an embodiment of the invention.

With reference now to FIG. 8, marker fluid 60 may be dispensed from a marker fluid bottle 42 into a mixing tube 38 to provide a mixed marker solution 62. As discussed above with reference to marker-making kit 10, the mixed marker solution 62 may include any number of colors of marker ink solutions, including a single or multiple colors of ink. In one example, the mixed marker solution 62 includes multiple washable ink solutions that are mixed together to form a consistent mixed marker solution 62.

Figure 9:
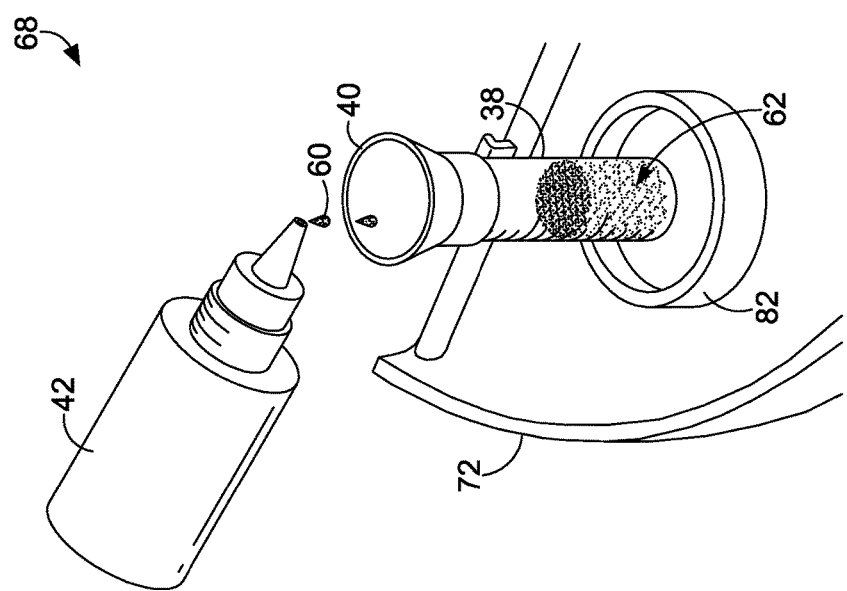
FIG. 9 is an enlarged, perspective view of a portion of the marker-making kit of FIG. 6, in accordance with an embodiment of the invention.

In FIG. 9, a marker reservoir 44 is submerged into the mixed marker solution 62 using the reservoir tweezers 86. As such, while embodiments of the marker-making kit 10 utilizes a marker-positioning mechanism 18 to maneuver the marker reservoir 44, the marker-making kit 68 provides a pair of reservoir tweezers 86 that couple to the marker reservoir 44. Embodiments of the reservoir tweezers 86 may be molded from a single unit such that a crossed-over mechanism provides a permanent "gripping" action against a marker reservoir 44. For example, a holding portion opens when pressure is applied to the body of the reservoir tweezers 86, and the reservoir tweezers 86 return to a gripping position when pressure is released.

Figure 10A:
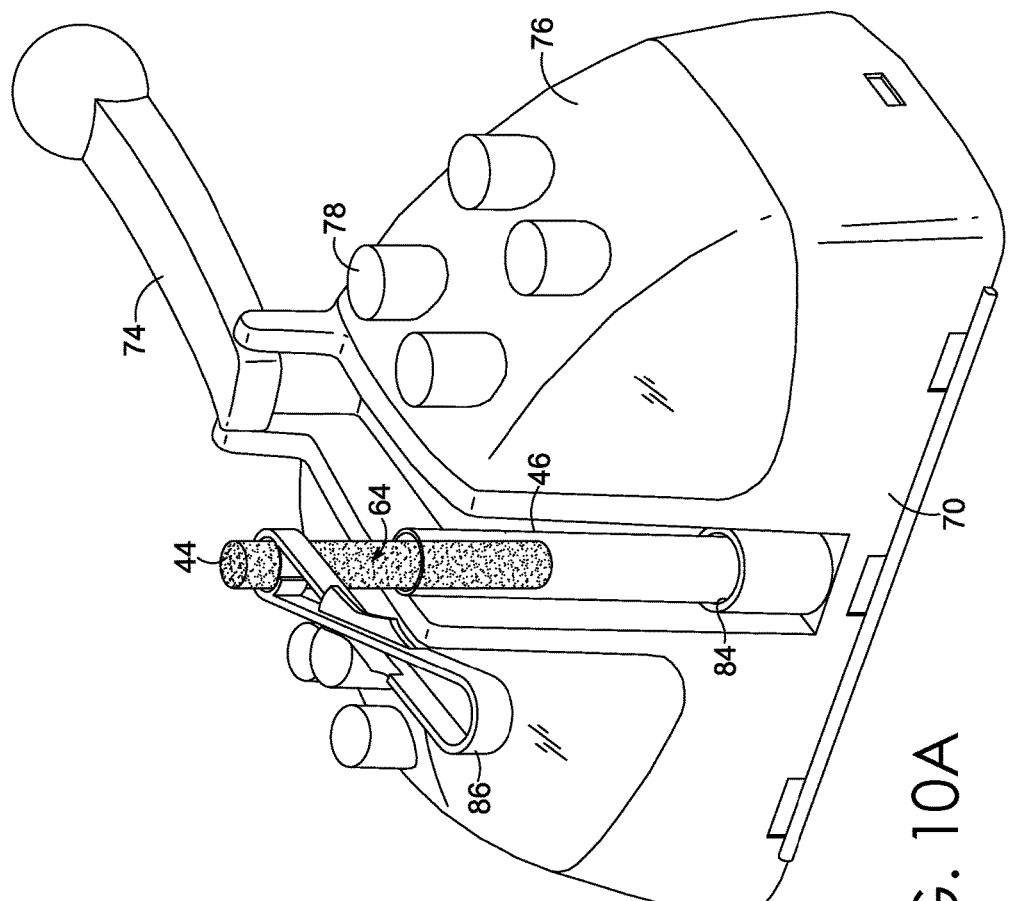
FIG. 10A is an enlarged, perspective view of a portion of the marker-making kit of FIG. 6, in accordance with an embodiment of the invention.
Figure 10B:
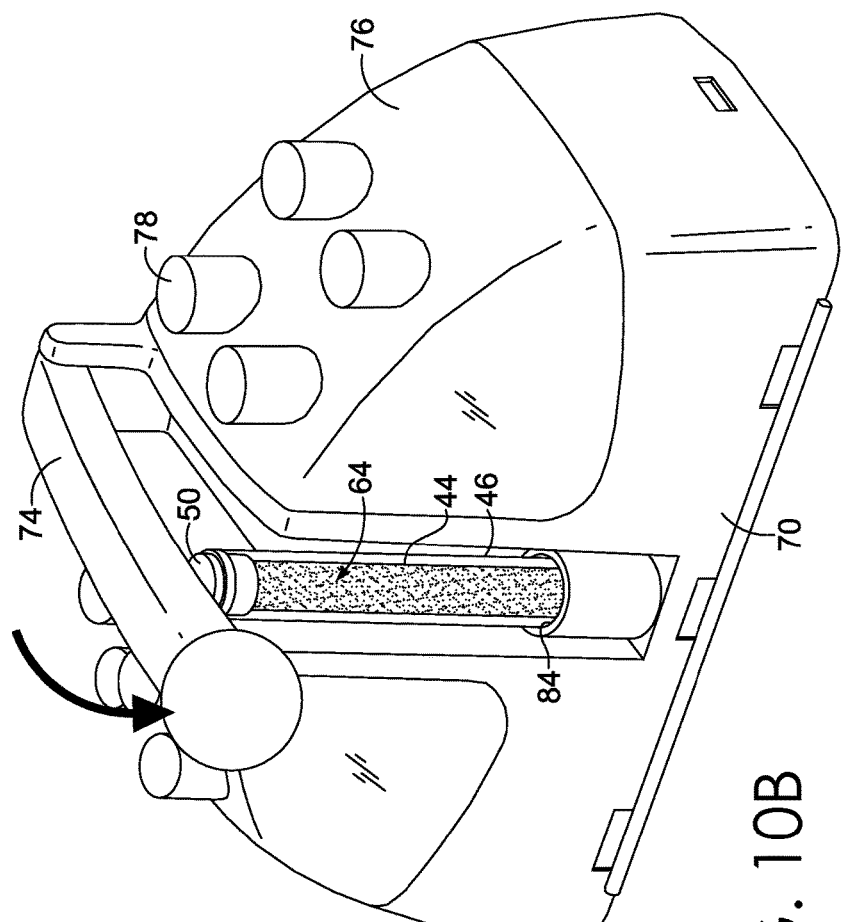
FIG. 10B is an enlarged, perspective view of a portion of the marker-making kit of FIG. 6, in accordance with an embodiment of the invention.

Having submerged marker reservoir 44 into the mixed marker solution 62, the saturated reservoir 64 is then lowered into a marker barrel 46, as depicted in FIG. 10A. In some embodiments, marker barrel 46 may be secured by the marker compression positioner 84 for compression by the compression arm 74. Compression arm 74 is in a first position in FIG. 10A, and a second position in FIG. 10B. Accordingly, in the second position, compression arm 74 may be used to apply force against the end plug 50, and marker barrel 46. In embodiments, securing end plug 50 into an end of the marker barrel 46 completes the assembly of the marker barrel 46 enclosing a customized, saturated reservoir 64.

Figure 12:
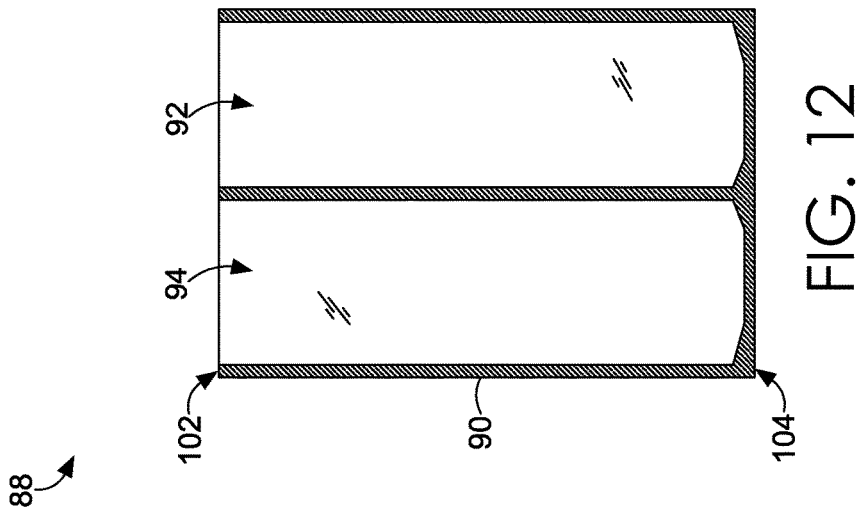
FIG. 12 is a cross-sectional view of the tri-chamber measuring cup of FIG. 11, in accordance with an embodiment of the invention.
Figure 11:
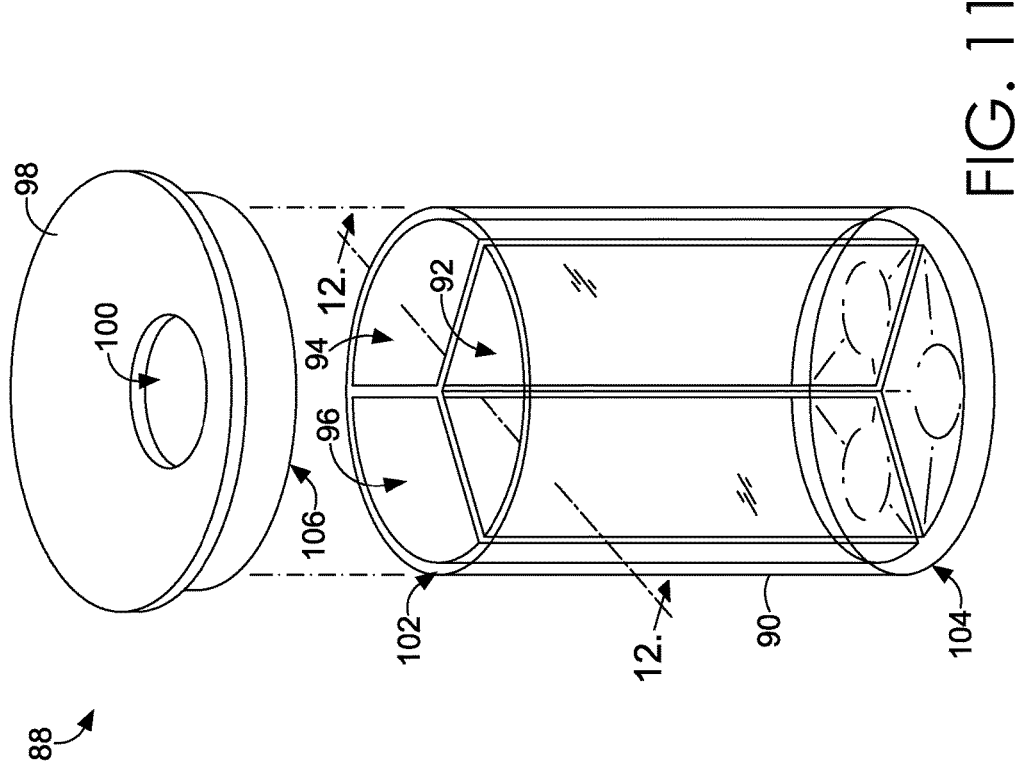
FIG. 11 is perspective view of a tri-chamber measuring cup, in accordance with an embodiment of the invention.

With reference to FIG. 11, a tri-chamber measuring cup 88 may be used with one or both of the marker-making kit 10 and the marker making kit 68. Embodiments of the tri-chamber mixing cup 88 include a cup housing 90 having a first chamber 92, a second chamber 94, and a third chamber 96. As will be understood, the mixing cup 88 may include any number of chambers to provide a multi-chamber mixing cup, such as a four-chambered mixing cup. A mixing cup cap 98 having an opening 100 may be coupled to a first end 102 of the cup housing 90. In embodiments, the second end 104 of the cup housing 90 may be positioned inside a mixing tube holder 16 (as shown in FIG. 1) and/or a mixing tube holder 82 (as shown in FIG. 7). In further embodiments, each of the first, second, and third chambers 92, 94, and 96 are individually contained, as partially-depicted in the cross-sectional view of FIG. 12.

During marker assembly, a user may remove the mixing cup cap 98 and pour a first quantity of a first marker fluid into the first chamber 92, a second quantity of a second marker fluid into the second chamber 94, and a third quantity of a third marker fluid into the third chamber 96. Having dispensed a desired amount of each marker fluid (such as a particular amount of three different colors of inks), the user may attach the mixing cup cap 98 to the cup housing 90, and pour the combined solution of three marker fluids into a single mixing tube 38 via the opening 100.

In another embodiment, the tri-chamber measuring cup 88 may be used to mix multiple maker fluids in each of the three individual chambers 94, 94, and 96, such that three marker reservoirs 44 may absorb separate mixed marker solutions 62 at the same time. For example, two different mixed fluids 60 may be combined to form a mixed markers solution 62 in each of the three chambers 92, 94, and 96. As such, a user may manipulate multiple marker fluids 60 to form a variety of mixed marker solutions 62 prior to application of such solutions by multiple reservoirs 44.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A customized marker assembly kit comprising:
   one or more marker barrels;
   one or more marker nibs;
   one or more marker reservoirs;
   one or more end plugs;
   one or more marker caps; and
   a handheld marker assembly device comprising:
   a base unit comprising at least one storage compartment; and
   a press mechanism comprising a compression arm, wherein the press mechanism is coupled to the base unit, the press mechanism adapted to assemble a customized marker comprising one of the one or more marker barrels, one of the one or more marker nibs, one of the one or more marker reservoirs, and one of the one or more end plugs, and wherein the compression arm is configured to apply a force against the end plug when a user rotatably maneuvers the compression arm to move the compression arm from a first position to a second position relative to the customized marker being assembled.

2. The kit of claim 1, further comprising a color-mixing tray coupled to the base unit, wherein the color-mixing tray comprises one or more mixing tube holders.

3. The kit of claim 2, wherein the color-mixing tray is removably coupled to the base unit.

4. The kit of claim 2, wherein the one or more mixing tube holders are configured to secure one or more mixing tubes to the color mixing tray.

5. The kit of claim 4, wherein the one or more mixing tubes comprise one or more of a graduated cylinder and a plug-in funnel that couples to an end of the graduated cylinder.

6. The kit of claim 4, wherein the one or more mixing tubes are configured to contain one or more marker fluids.

7. The kit of claim 1, wherein the at least one storage compartment is adapted to store one or more of additional marker barrels, additional marker nibs, additional marker reservoirs, and additional end plugs.

8. An apparatus for assembling a customized marking device comprising:
   a base unit comprising at least one storage compartment and a marker compression positioner comprising a cavity; and
   a press mechanism adapted to assemble a marking device secured within the cavity of the marker compression positioner, the marking device comprising a marker barrel and an end plug, wherein the press mechanism comprises a compression arm rotatably coupled to the base unit at a rotation point, wherein the arm is configured to apply a direct force against the end plug of the marking device secured by the marker compression positioner when the compression arm is rotatably moved by a user from a first position to a second position relative to the marker compression positioner;
   wherein, when in the first position, the compression arm is not vertically aligned with the cavity of the marker compression positioner; and wherein, when in the second position, the compression arm is vertically aligned with the cavity of the marker compression positioner.

9. The apparatus of claim 8, further comprising a marker positioning mechanism coupled to the base unit and comprising an articulating arm adapted to rotatably maneuver a position of a marker reservoir relative to the base unit, the marker positioning mechanism further comprising a marker pivot arm having a marker pivot clip adapted to secure the marker reservoir during maneuvering.

10. The apparatus of claim 8, wherein the at least one storage compartment is configured to hold one or more of the following:
    one or more marker fluid bottles;
    one or more marker labels;
    one or more color wheel mixing guides; and
    one or more marker caps.

11. The apparatus of claim 8, further comprising a tri-chamber measuring cup adapted to receive a plurality of marker fluids and dispense the plurality of marker fluids into one or more mixing tubes.

12. The apparatus of claim 8, wherein the base unit further comprises one or more pivotable side trays configured to store one or more completed customized marking devices.

13. A handheld marker making device comprising:
    a base unit comprising:
    at least one storage compartment; and
    a marker compression positioner comprising a cavity for receiving a marker and configured to secure the marker to the base unit; and
    a press mechanism coupled to the base unit, the press mechanism adapted to assemble the marker comprising a marker barrel, a marker nib, a marker reservoir, and an end plug;
    wherein the press mechanism comprises a compression arm rotatably coupled to the base unit at a rotation point, wherein the compression arm is configured to apply a direct force against the end plug of the marker secured by the marker compression positioner when the compression arm is rotatably moved from a first position to a second position relative to the marker compression positioner.

14. The device of claim 13, further comprising an articulating arm coupled to the base unit, the articulating arm adapted to rotatably maneuver a position of the marker reservoir relative to at least one mixing tube.

15. The device of claim 13, wherein the at least one storage compartment is configured to hold one or more of the following:
    one or more marker barrels;
    one or more marker nibs;
    one or more marker reservoirs;
    one or more end plugs;
    one or more marker fluid bottles;
    one or more marker labels;
    one or more color wheel mixing guides; and
    one or more marker caps.

16. The device of claim 13, wherein the press mechanism is configured to secure the end plug onto an end of the marker barrel.

17. The device of claim 13, wherein the base unit is configured to hold one or more mixing tubes that are configured to hold marker fluids, and wherein the marker reservoir is configured to absorb marker fluid from one of the one or more mixing tubes.

18. The device of claim 13, further comprising a color-mixing tray coupled to the base unit, the color-mixing tray having one or more mixing tube holders on a surface of the color-mixing tray adapted to hold one or more mixing tubes.

19. The device of claim 13, wherein the compression arm comprises a first end at the rotation point and a second end opposite the first end, wherein, when in the first position, the compression arm is not vertically aligned with the cavity of the marker compression positioner and wherein, when in the second position, the second end of the compression arm is vertically aligned with the cavity of the marker compression positioner.

\* \* \* \* \*

UNITED STATES PATENT AND TRADEMARK OFFICE
CERTIFICATE OF CORRECTION

PATENT NO. : 10,286,722 B2
APPLICATION NO. : 14/881988
DATED : May 14, 2019
INVENTOR(S) : Robert J. Henry et al.

Page 1 of 1

It is certified that error appears in the above-identified patent and that said Letters Patent is hereby corrected as shown below:

On the Title Page

Notice: "Subject to any disclaimer, the term of this patent is extended or adjusted under 35 U.S.C 154(b) by 341 days." should read --Subject to any disclaimer, the term of this patent is extended or adjusted under 35 U.S.C 154(b) by 341 days. This patent is subject to a terminal disclaimer.--.

Signed and Sealed this
Twenty-fourth Day of December, 2019

Andrei Iancu
*Director of the United States Patent and Trademark Office*